(No Model.)

J. S. DICKSON.
SLEEVE NUT.

No. 339,534. Patented Apr. 6, 1886.

Witnesses.
J. A. Burns,
N. L. Gill.

Inventor.
John S. Dickson
by Bakewell & Kerr
his Attorneys

UNITED STATES PATENT OFFICE.

JOHN S. DICKSON, OF PITTSBURG, PA., ASSIGNOR TO THE PITTSBURG HOB-NAIL MANUFACTURING COMPANY, OF SAME PLACE.

SLEEVE-NUT.

SPECIFICATION forming part of Letters Patent No. 339,534, dated April 6, 1886.

Application filed December 14, 1885. Serial No. 185,551. (No model.)

*To all whom it may concern:*

Be it known that I, JOHN S. DICKSON, of Pittsburg, in the county of Allegheny and State of Pennsylvania, have invented a new and useful Improvement in Sleeve-Nuts; and I do hereby declare the following to be a full, clear, and exact description thereof.

Figure 1:
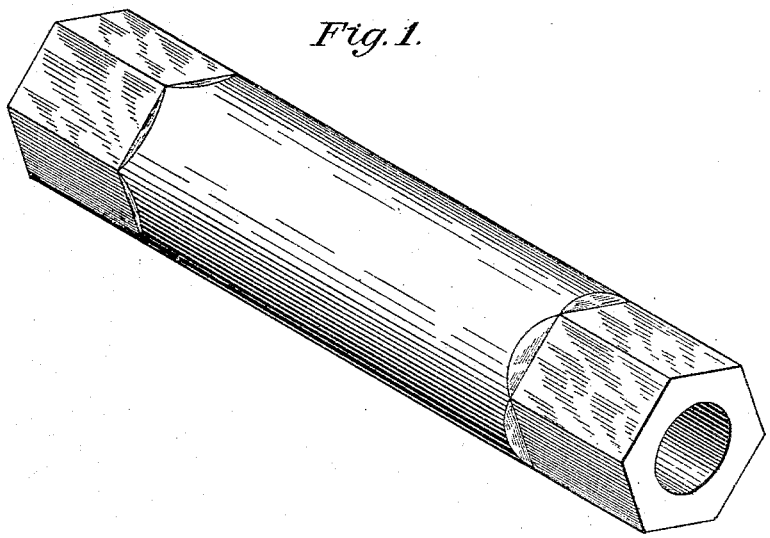
Figure 2:
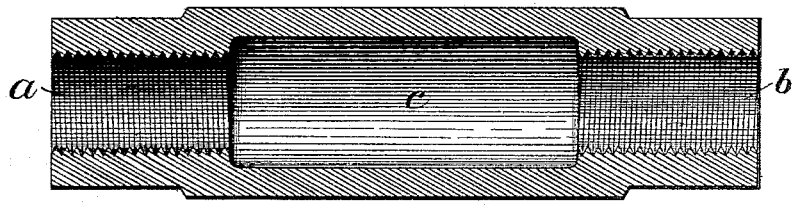
Figure 3:
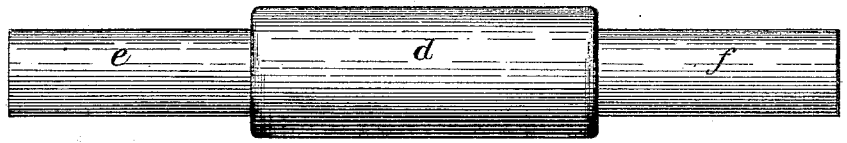

In the accompanying drawings, forming part of this specification, Figure 1 is a representation of one of my improved sleeve-nuts. Fig. 2 is a longitudinal section through the axial line of Fig. 1. Fig. 3 is the core of the mold used for casting my improved sleeve-nuts.

Sleeve-nuts are usually made of wrought-iron forged into the required shape. Externally they may be partly cylindrical and partly polygonal, as in the drawings, or entirely polygonal, the polygonal shape being designed to permit of their being readily turned by a key, wrench, or spanner. The interior of the sleeve-nut is cylindrical at each end, such cylindrical portions $a\ b$ being threaded with female screws having right-hand threads at one end and left-hand threads at the other end. Between the threaded ends $a\ b$ the cavity of the sleeve-nut is of enlarged diameter, as at $c$, so as not to engage the screw-threads of the rods screwed into the sleeve, excepting at the two ends $a\ b$. Heretofore such sleeve-nuts have been made of wrought-iron forged into shape. In order to make the interior of the configuration described—that is, with a cylindrical cavity or bore at each end of the requisite diameter for the rods to be screwed into them, and an enlarged cavity in the middle portion—the sleeve-nuts are either made in two semi-cylindrical pieces, (like Fig. 2 of the drawings,) which are then welded together, or they are made by taking a hollow wrought-iron cylinder with a bore throughout its entire length of the enlarged diameter of the middle portion, $c$, of the interior of the sleeve, and then inserting at each end a short hollow cylinder having its external diameter equal to the diameter of the bore of the enlarged portion $c$ of the sleeve and the internal diameter required for the end portions of the sleeve which are to be threaded. These tubular pieces are then welded into the hollow iron cylinder first mentioned, leaving a cavity in the middle portion of the sleeve of the full diameter of the hollow cylinder or shell of the sleeve. In either of these methods of making sleeve-nuts it is a difficult matter, requiring very careful work, to form a perfect weld between the two semi-cylindrical pieces in one case, or between the shell of the sleeve and the short cylindrical pieces introduced at each end. As these sleeve-nuts are chiefly employed for uniting the ends of suspension-rods or tie-rods in constructing bridges and other structures in which the rods are exposed to great longitudinal strains, it is of vital importance that the sleeve-nut should be perfectly homogeneous, as any defect in the welding together of the parts of which the sleeve-nut is composed is attended with the most disastrous consequences.

My invention therefore consists in constructing sleeve-nuts of a single piece of iron, preferably homogeneous in structure, and I have discovered that I can accomplish this purpose with the most successful results as to strength of material and cheapness of construction by casting the sleeve-nuts in a mold of the desired exterior and interior configuration and then carefully annealing them.

In order to enable others to make use of my invention, I will proceed to describe the method I employ in making my improved sleeve-nuts.

I use a mold having a shell of iron, or a sand mold, as may be preferred, in which, by means of suitable patterns, I form a matrix of the exterior shape of the sleeve-nut, and insert a core of the shape shown in Fig. 3, having a middle portion, $d$, of the diameter of the enlarged cavity $c$ of the sleeve-nut, and two end pieces, $e\ f$, of the required diameter for the bore of the sleeve-nut at each end. I then pour molten iron into the mold, taking care to use metal of the proper quality. When the casting is cold, it is put into an acid bath or pickle to remove the scale. The interior of the casting is then packed with oxide of iron slightly impregnated with ammonia, and is placed in an iron box or case containing oxide of iron and ammonia. A number of these castings may, if preferred, be packed in a single case or iron box. The box containing the casting or castings is then placed in an annealing-oven, which is then gradually heated to a bright cherry-red, and is kept as nearly as possible at the same temperature for a sufficient time, when the fire is removed from the oven and it is allowed to cool gradually. I have found that by gradually raising the heat of the oven for twelve hours, or half a day, then keeping it at the desired heat for six days, and then cooling the oven during a period of twelve hours, the best results for these sleeve-nuts are attained.

When the annealing-oven is cooled off, the cases containing the sleeve-nuts are removed, the annealed castings are placed in pickle to remove the scale. They are then placed in a tumbling-barrel, after which the screw-threads are cut through the smaller bore at each end, and the sleeve-nuts are thus finished and ready for use.

I have tested my improved sleeve-nuts with the most surprising results. For instance, I took a sleeve-nut of my improved construction having a screw-hole of one and twenty-five one-hundredths inch diameter, and having screwed wrought-iron rods into each end, I subjected it to a longitudinal strain on the rods, increasing the strain until the sleeve-nut broke at a strain of eighty-eight thousand pounds. The area of the cross-section of the sleeve-nut at the point of fracture was two and five hundred and thirty-five one-thousandths inches, giving a tensile strain of thirty-four thousand seven hundred and fourteen pounds to a square inch. This test proves satisfactorily the superiority of sleeve-nuts made in the manner I have described.

Another great advantage of my invention is that my improved sleeve-nuts are not only greatly superior in strength to the forged sleeve-nuts, but they can be made at a greatly-reduced price as compared with forged sleeve-nuts.

I am aware of the patent to G. H. Sellers, No. 236,723, dated January 18, 1881, in which is described a wrought-iron sleeve-nut made by forging a tube in polygonal dies and upon a mandrel of the desired shape, and then forging the ends in cylindrical dies on a smaller mandrel, and do not desire to claim the same, for it is the disadvantages resulting from the expense and bulk of an article so made that my invention is intended to remedy.

What I claim as my invention, and desire to secure by Letters Patent, is—

As a new article of manufacture, sleeve-nuts having an internal screw-thread at each end, and an enlarged unthreaded cavity in the middle, constructed of cast metal and annealed, substantially as described.

In testimony whereof I have hereunto set my hand this 1st day of December, A. D. 1885.

JOHN S. DICKSON.

Witnesses:
W. B. CORWIN,
THOMAS W. BAKEWELL.